United States Patent [19]

Miller et al.

[11] 4,338,031
[45] Jul. 6, 1982

[54] LASER GRADE, ELEVATION, CURVE SURVEYING SYSTEM

[75] Inventors: John M. Miller, Huntington Station; Richard O. Barton, Levittown, both of N.Y.

[73] Assignee: Grumman Aerospace Corporation, Bethpage, N.Y.

[21] Appl. No.: 137,367

[22] Filed: Apr. 4, 1980

[51] Int. Cl.³ .................. G01B 9/02; G01B 11/02; G01B 11/26
[52] U.S. Cl. ................... 356/356; 356/138; 356/354; 356/397
[58] Field of Search ........................... 356/354–356, 356/358–360, 363, 397, 1, 28, 28.5, 2, 138–140, 377, 28, 152; 340/146.3 P; 250/550, 556, 558, 237 G; 33/27 R, 286–287, 1 C, 1 N, 1 Q

[56] References Cited

U.S. PATENT DOCUMENTS

| | | | |
|---|---|---|---|
| 3,269,254 | 8/1966 | Cooper et al. | 356/138 |
| 3,664,746 | 5/1972 | McKnight | 33/286 |
| 3,801,205 | 4/1974 | Eggenschwyler | 356/138 |
| 3,900,262 | 8/1975 | Baxter | 250/237 G |
| 4,103,547 | 8/1978 | Vrabel | 33/1 Q |
| 4,176,456 | 12/1979 | Beckmann | 33/1 Q |

*Primary Examiner*—William H. Punter
*Attorney, Agent, or Firm*—Richard G. Geib

[57] ABSTRACT

A method for surveying is disclosed which functions to define all curves, grades and super elevations to a parabolic shape by impinging two laser beams, each of which is provided with a grid type means so as to create a diffracted fan of beams emitted from each laser. The intersections of these beams are utilized to form the parabolic shapes.

8 Claims, 11 Drawing Figures

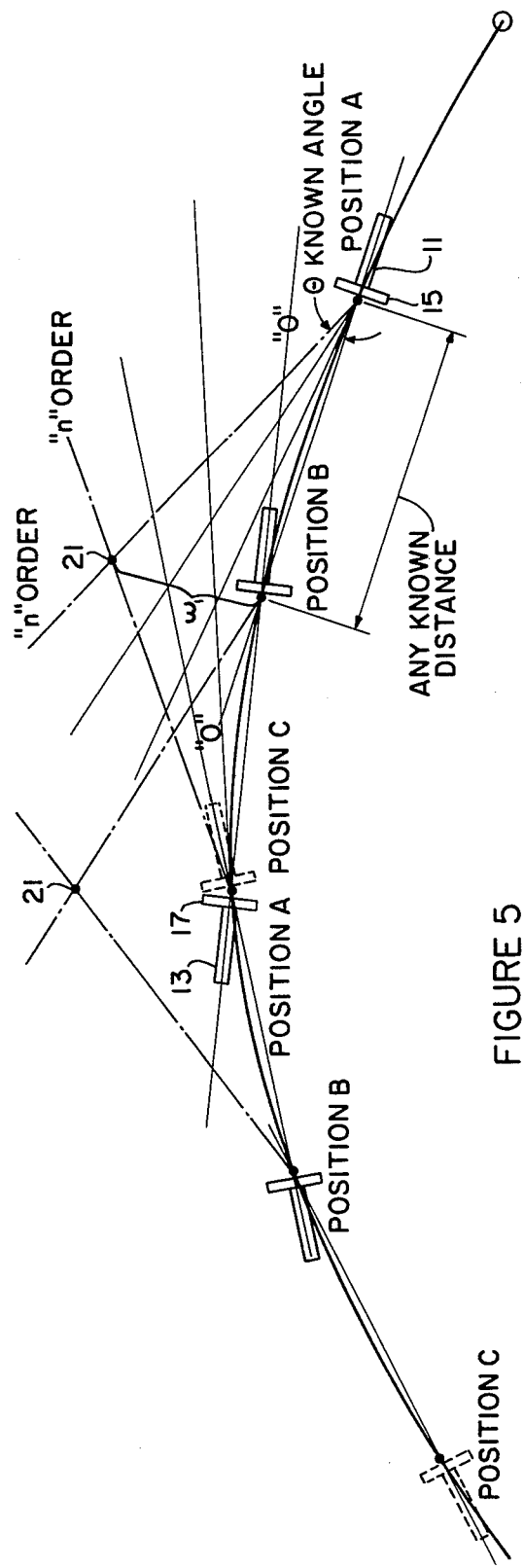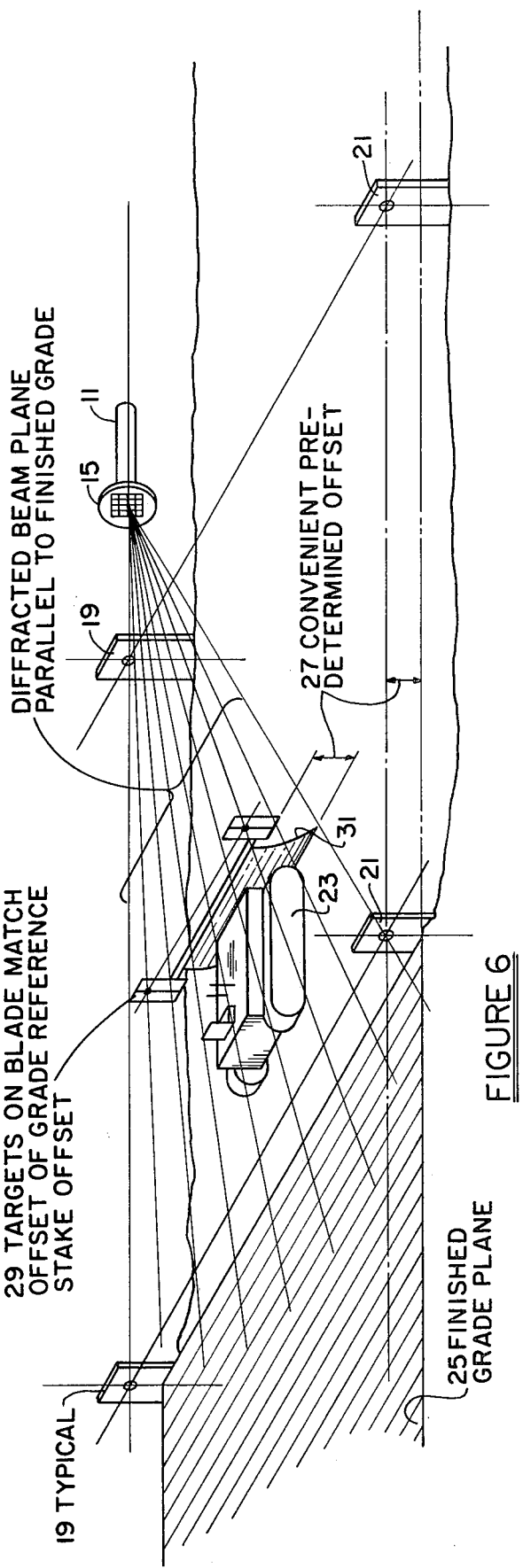

DIRECTION OF MOTION
OF TARGET BOARD

PERFECT
COLLINEATION

VERTICAL
MISALIGN
COLLINEATION

LASER GRADE, ELEVATION, CURVE SURVEYING SYSTEM

BACKGROUND OF THE INVENTION

The present invention relates to an improved surveying method, and more particularly, to a laser surveying technique which can be used to accurately define all curves, grades or elevations.

Conventional surveying methods require the use of a surveyor's transit and a highly skilled operator. Each section of a curve to be surveyed is typically configured as a true radius. Each point thereon is located by two dimensions which are physically measured with respect to two centerlines.

The prior art methods which necessitate repetitive angular and linear measurements are susceptible to mistakes in measurements and miscalculations. Furthermore, the time required to accurately survey a given curve, grade or elevation may be inordinately lengthy and expensive.

Conventional laser systems are designed for a multitude of purposes have been generally commercially available since the 1960's. Basic refinements in these systems have included bulk reductions and the advent of the low power laser (with an output of the order of several milliwatts). With the compacting of laser technology, the number of practical laser applications have been compounded.

In the field of manufacturing alignment techniques, laser devices are firmly embedded for applications such as aligning avionic systems on sophisticated aircraft. One exemplary system which not only senses misalignment, but also allows accurate angular measurement of such displacement is described in the copending patent application "Triaxis Laser Alignment System" (Ser. No. 200,003 filed Oct. 23, 1980), assigned to the common assignee of this application.

Yet despite this increased application of laser devices, no one has heretofore proposed such a technique as the present invention which utilizes one or more diffracted laser patterns to enable surveying a curved roadway.

Accordingly, it is a principle object of the present invention to provide a method of surveying through the use of diffracted laser beams as to define a curved track, grade or super elevation.

It is another object of the present invention to provide a method of impinging two diffracted laser beams to create a grid which may be used to define the course of a curved track.

Yet another object of the invention is to provide a laser surveying method which requires only low operator skills to accurately define the curve, grade and elevation of a roadway, railway or waterway.

These and other objects and advantages of the present invention are accomplished by diffracting one or more laser light sources to cover the area to be surveyed. A reference line, such as a road straightaway centerline may be used to align the laser zero order beam. The curved road portion is plotted by colineating two fans of diffracted laser beams to form a grid from which the desired parabolic shape can be easily charted and marked.

Grade markings may be effected by regulating the angular orientation of the laser beam ruling as to define a desired angular plane with the fan of diffracted laser beams.

Elevational levels are determinable by vertically orienting the laser grating to define known vertical angular increments which can readily be translated into linear distances.

The curve radius, grade and elevation may accordingly be varied throughout the length of the curve to the most practical form for any given application. Transition curve sections may be readily mated by the best tailored fit.

BRIEF DESCRIPTION OF THE DRAWINGS

FIG. 5 illustrates the use of the present inventive technique to define the width of curved and straight track sections.

FIG. 6 illustrates the use of the present inventive technique to define grade levels.

DETAILED DESCRIPTION OF THE INVENTION

Figure 1:
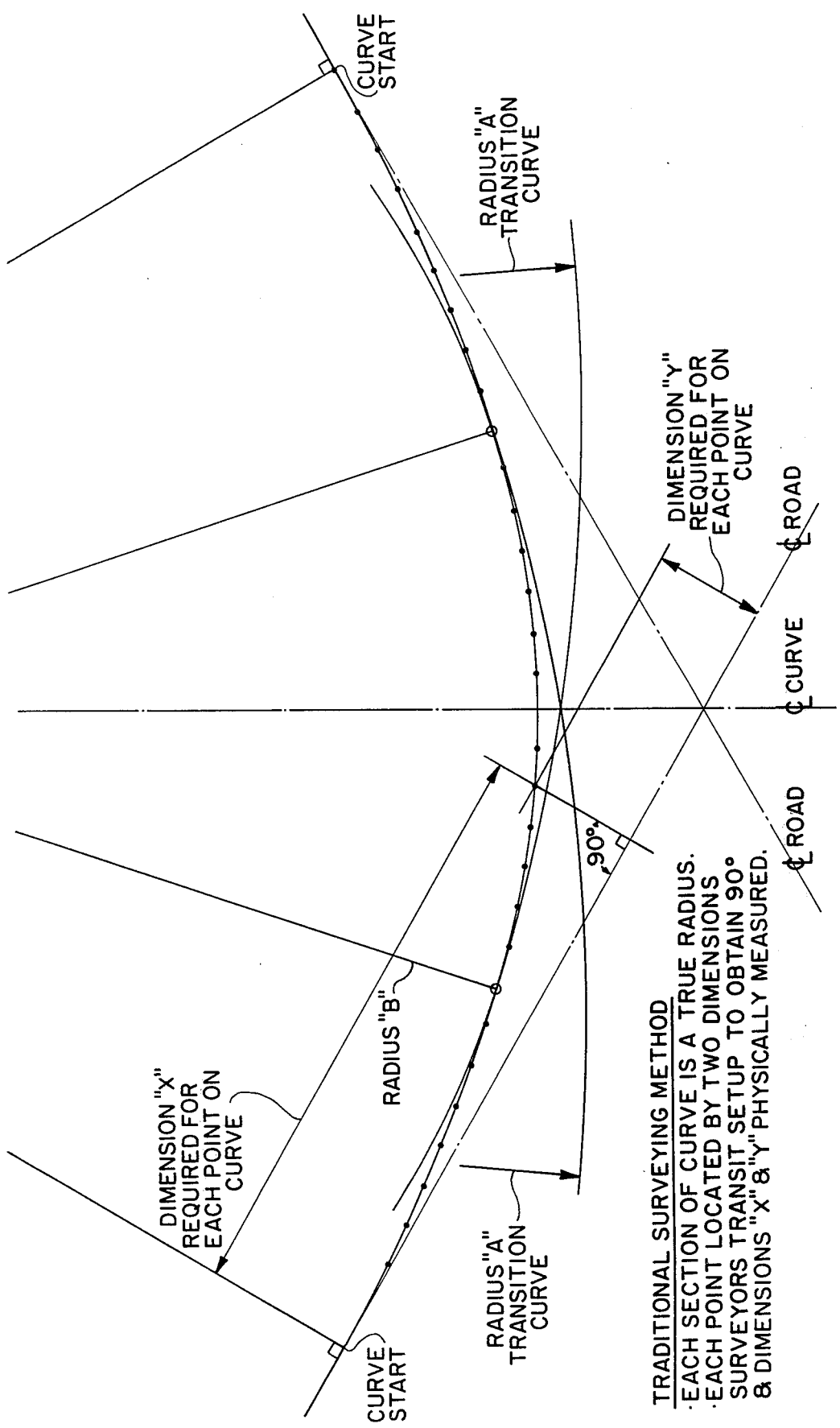
FIG. 1 is a diagramatic view of the prior art traditional surveying method of curve generation.

FIG. 1 illustrates the conventional surveying method used to define the path of a curved track. The intersection of the road centerlines locates the curve centerline which is employed to configure each section of the curve as a true radius. Points along the curve are located by two dimensions, X and Y, which are physically measured with respect to the two road centerlines.

Figure 2:
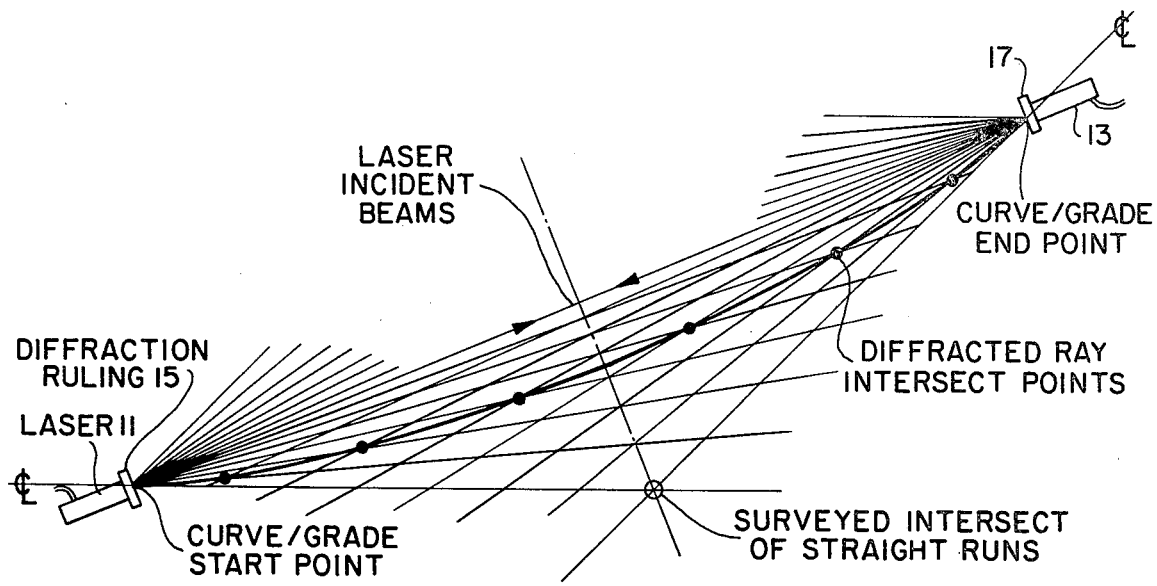
FIG. 2 is a diagramatic view of illustrating one embodiment of the present inventive method wherein a curved track is defined by the intersection of diffracted laser beams having their zero order beams directed towards each other.

Referring to FIG. 2 of the drawings, one embodiment of the present inventive method is shown wherein two sources of collimated light are used to define the shape of a curved track. The track so defined may in practice be a roadway, railroad, canal or other thoroughfare.

Collimated light sources 11 and 13 may be identical low power laser devices. Rulings 15 and 17 are interposed directly in front of sources 11 and 13 respectively at points intersecting the center lines of the connecting thoroughfares. Rulings 15 and 17 may also be identical and comprise diffraction means known to those skilled in the art as ronchi rulings consisting of alternating parallel, equal width, clear and opaque lines, usually machined into a piece of glass.

The orientation of sources 11 and 13 is shown adjusted such that their zero order beams are co-linear.

It becomes quite obvious that the only prerequisite for this invention's function is the location of the track centerline at curve start and end points.

As can be seen in FIG. 2, the effect of rulings 15 and 17 is to such create a fan of diffracted beams which traverse one another in the area of the curve to be surveyed. Traverse points may be easily marked by a worker walking about in the area of the diffracted beams. Various targeting apparatus, whose details are more fully explained below, may be used to locate the beams if necessary.

Curve markers may be fixed at predeterminable points on the fan patterns allowing the formation of a parabolic curve. Each end of the curved track would be perfectly blended with the connecting track portion. The radius of the curve may be varied in accordance with practical considerations by selecting different pattern traverse points and by changing one or more of the beam rulings to vary the angular frequency of the diffracted pattern.

For example: Assume a 1000 ft. distance from curve start to intersect of straight runs, with a convenient staking interval of approximately 50 ft. increments. A ronchi ruling of one thousand lines per inch impinged upon a laser beam would generate a diffraction fan of beams whose discrete angular displacement between each order is 25 mils. This would provide intersecting points at such intervals.

To double the number of intersects in the same 1000 ft., it is only necessary to select a ruling of 500 lines per inch which provides a discrete angular displacement of 12.5 mils between orders.

Figure 3:
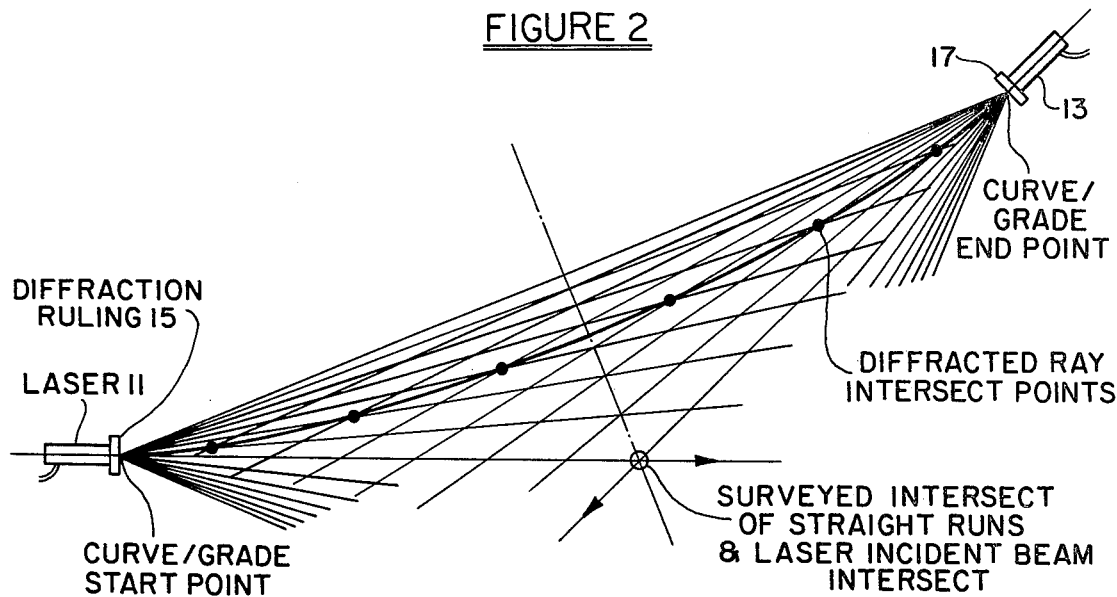
FIG. 3 is also a diagramatic view illustrating another embodiment of the present inventive method wherein laser sources are aligned with the centerline at the curve start point and curve end point.

FIG. 3 depicts an alternate method for defining the shape of a curve. In contrast to the method of FIG. 2, collimated light sources 11 and 13 are shown as aligned with the center lines of the connecting track portions. Rulings 15 and 17 are located at the forward ends of sources 11 and 13 respectively.

Once again, the curved track is marked at predeterminable points at which the diffracted beam patterns traverse. FIG. 3 shows that the zero order beams from sources 11 and 13 traverse at some point which lies on the centerline of the curved track. Some order, n, of each diffracted pattern also intersects the zero order beam of the remaining source at the zero order aperture of the opposite ruling. This point may also be termed the curve start or curve end point. From this point, markers are shown located at graduated traverse points within the diffracted beam pattern. The graduation of the curved track section changes as the track crosses the curve centerline from decreasing radius to an increasing radius. Ultimately, the curved section blends into the centerline of the connecting thoroughfare at the curve end point.

The techniques shown in FIGS. 2 and 3 are equally acceptable. However, in some field conditions such as mountainous or heavily wooded terrain, the actual intersect of the straight runs may not be visible. In this case, the technique as shown in FIG. 2 would eliminate what could be very expensive and time consuming clearing operations.

Referring again to FIGS. 2 and 3, it becomes obvious that vertical curves to blend in changes in elevation of a track would use the same inventive technique, the only change being to orient the fan of diffracted beams vertically rather than horizontally, the end points being defined as "grade" start and end points rather than "curve" start and end points.

Figure 4:
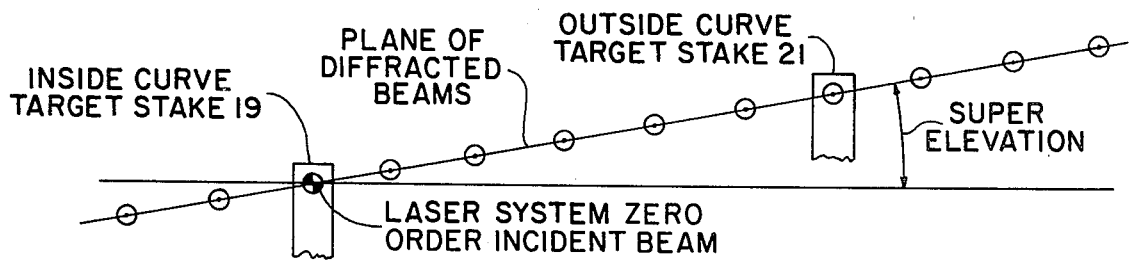
FIG. 4 illustrates the use of the present inventive technique to define super elevational planes.

In FIG. 4, the use of the diffracted beam pattern to define super elevation of a track portion is illustrated. The zero order incident beam of diffracted collimated beam pattern is impacted upon a target stake 19. Stake 19 may be located along the inside boundary of the curved track, along the centerline of the curved track (as defined by the procedures described in connection with FIGS. 2 and 3), or at any convenient known reference location.

The angular orientation of the diffraction ruling may then be dialed to the desired level as to define an angular plane of diffracted beams which can be used to mark remaining super elevational levels across the width of the track in line with stake 19.

In one scenario, the width of the track is already marked. Elevational markings are, therefore, made at predetermined locations along the height of the width markers, such as outside curve target stake 21.

FIG. 5 illustrates another scenario in which the width of the track is determined based upon a known diffraction ruling frequency and a known linear distance between the diffraction ruling and the target stake. In FIG. 5 the beam is shown to project along a centerline "0" and is diffracted over an angle $\theta$ illustrated by the angle between the "n" order and the centerline "0" for the right facing and left facing instruments at their respective positions "A". A simple trigonometric relationship may be established to determine the width of the track with respect to the beam pattern using the known angular displacement of the Nth order beam. With the use of dual diffraction patterns, the curved track outer boundary markers, 21 may be accurately positioned with respect to both width and elevation, using the same laser diffraction ruling devices as configured in FIGS. 2 and 3, i.e., with "A", "B" and "C" being selected positions of the previously noted left and right facing instruments, 11 and 13 respectively, the dimension between the points of intersection of the "n" order and "0" order beams define $W_1$ the desired curb-to-curb track width.

No further illustration is needed to demonstrate that this inventive principle works equally as well to define track width on straight runs.

Vehicular mounted laser diffraction assemblies, held in any one of several common pivoting mount configurations would obviously make this operation relatively quick and simple to perform.

FIG. 6 illustrates one application of the present inventive technique wherein a ronchi ruling is impinged upon a laser beam to create a diffractive fan of beams to provide a reference plane for finish leveling or grading of any roadway or track. Prior art devices include laser scanning systems in which a motor driven right angle prism is impinged upon the beam of a laser mounted vertically. The herein disclosed inventive technique provides the same convenient plane without the necessity of expensive prisms or motors.

As shown in FIG. 6, ruling 15 is interposed in front of light source 11 to produce a diffracted beam pattern which may be oriented in a plane parallel to the desired finished grade 25. Curve target stakes 19 and 21 may be located as previously described. Grading vehicle 23 is shown having a target 29 affixed to each side of the vehicular blade 31. The height of the blade may, therefore, be adjusted to insure continued impingement of the diffracted beam upon the targets 29, thereby providing a continuous grading reference to the vehicle operator. Proper grading of the track surface is, therefore, simplified. The vertical offset 27 between targets 29 and the ground or lower blade surface may be adjusted to any convenient distance with regard to the orientation of source 11 and ruling 15. Further utility of the present invention in other particular applications will be apparent to those skilled in the art.

FIG. 7 depicts some common target at target mounting conditions. For convenience, the gravity vector should be used to maintain the target true vertical line 33 on target 35. The target board itself may be any of many translucent materials of appropriate size with dark opaque target point suitably inscribed.

Figure 7A:
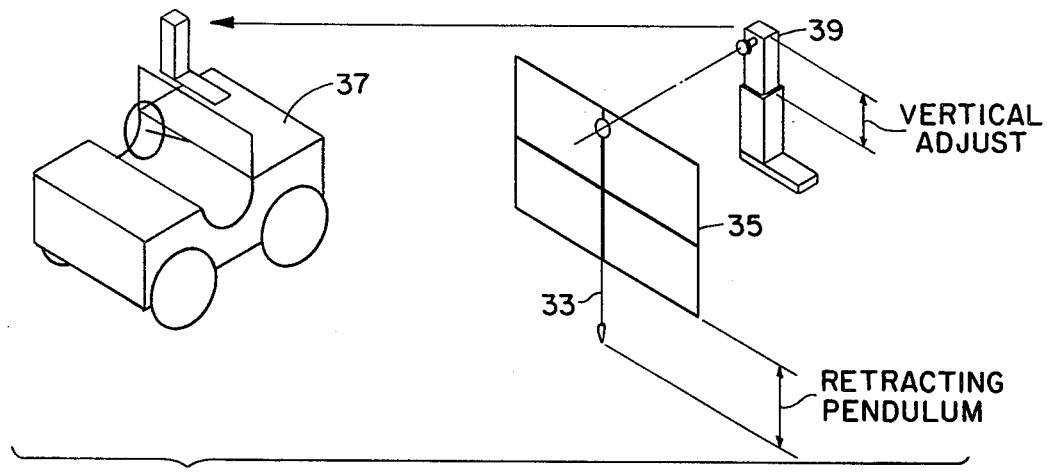
FIGS. 7A, B, C and D illustrate several possible variations of target configurations and their use.

FIG. 7A illustrates the use of target board 35 mountable upon vehicle 37 via vertically adjustable mounting means 39.

Figure 7B:
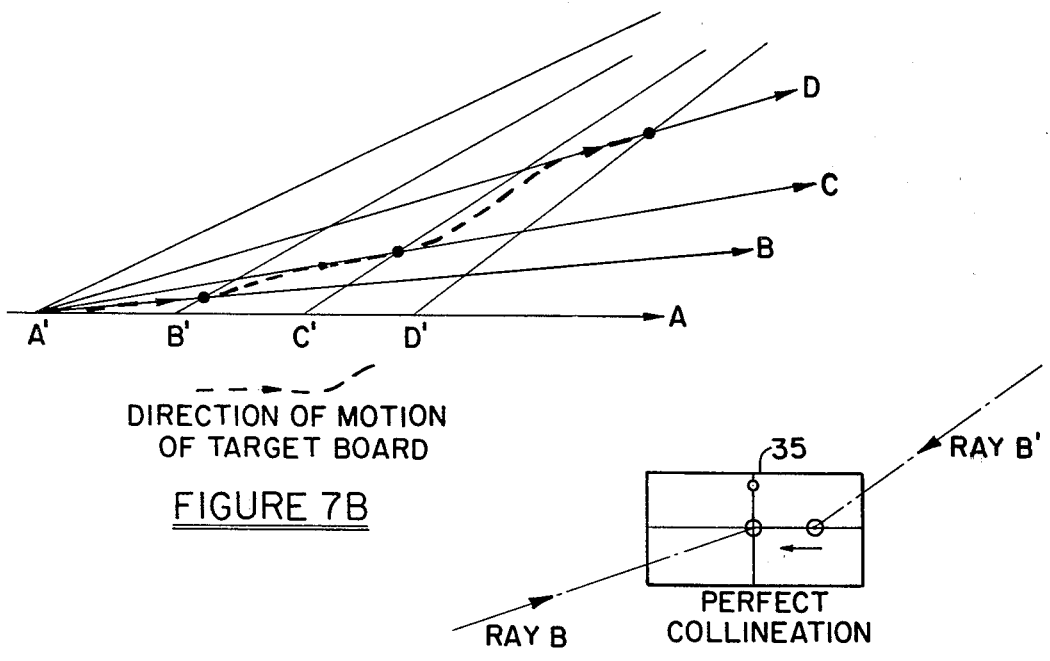
Figure 7C:
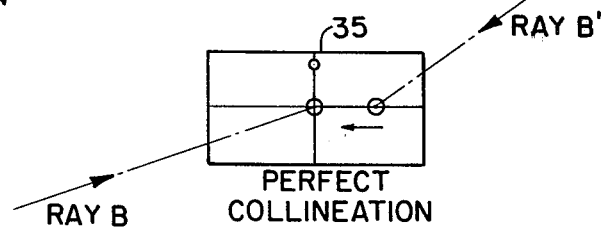
Figure 7D:
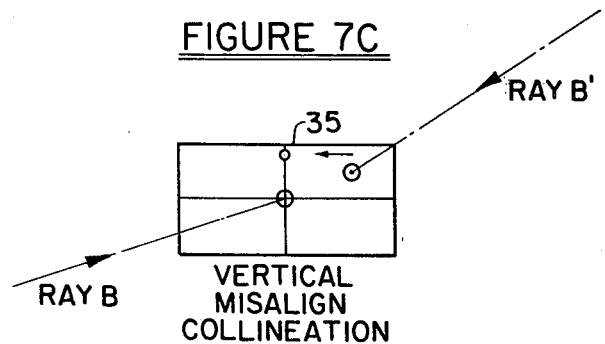

Direction of motion for target spot acquisition and intersection is depicted in FIG. 7B. By proceeding down one ray line (i.e., A, B, C or D), the intersecting ray spot from ray A, B, C or D will move towards the target centerline from edge of target as shown in FIG. 7C. Vertical colineation of the intersecting rays is unnecessary as long as target line 33 is a true vertical line. FIG. 7D demonstrates the use of target 35 to determine beam intersection points where the beam patterns are in different vertical planes.

Figure 8:
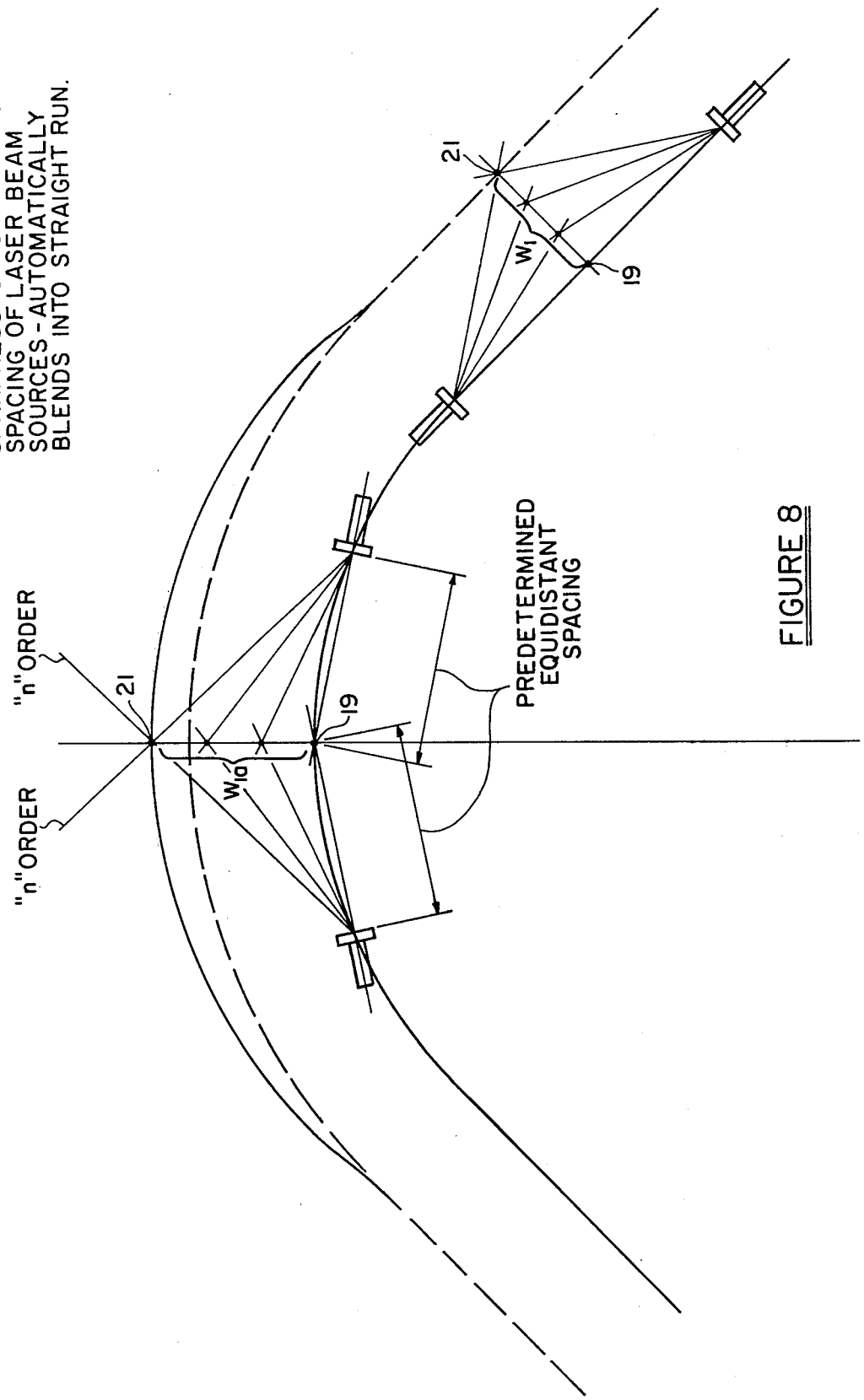
FIG. 8 is a schematic overhead view of the roadbed as developed according to this invention.

With reference now to FIG. 8 there is shown a roadbed developed by use of equidistant light sources relative to markers 19 and 21 to generate the roadbed having width $W_1$ that grows gradually to that of $W_{1a}$ in the middle of the curve or to define the width $W_1$ of a straight path as shown in the right portion of FIG. 8.

Having described several embodiments of the present invention, it will be apparent that various types of target devices or target mounting means may be used in conjunction with the present invention according to the particular application. Moreover, these and other operative variations which may be apparent to one skilled in the art may be made without departing from the spirit and scope of the invention, which is meant to be limited only by the appended claims which follow.

What is claimed is:

1. A laser surveying method for defining the path of a curved track, said method comprising:
    projecting a first diffracted fan of laser beams from a first point along the track,
    projecting a second diffracted fan of laser beams from a second point along the track as to traverse said first fan of laser beams,
    marking selected points at which said first and second fans of laser beams intersect,
    connecting said selected points as to define a curved track.

2. A laser surveying method for defining the path of a curved roadway section located between first and second abutting roadway portions, said method comprising:
    defining the centerlines of first and second abutting roadway portions,
    aligning first and second laser beam sources along said first and second abutting roadway centerlines respectively,
    interposing first and second rulings having predetermined frequencies in front of said first and second laser beam sources as to effect first and second fans of diffracted laser beams which fans traverse in the area of the curved roadway section,
    marking selected points at which said first and second fans of diffracted laser beams intersect, and
    connecting said selected points as to define the centerline of the curved roadway section.

3. The method as recited in claim 2 wherein said first and second diffracted laser beams have zero order beams which are directed to intersect at the centerline of the curved path to be defined.

4. A laser surveying method for defining the path of a curved roadway section located between first and second abutting roadway portions, said method comprising:
    defining the centerlines of first and second abutting roadway portions,
    positioning first and second laser beam sources on said first and second abutting roadway centerlines respectively,
    interposing first and second rulings having predetermined frequencies in front of said first and second laser beam sources as to effect first and second fans of diffracted laser beams,
    directing said first and second diffracted laser beams such that their zero order beams are co-linear whereupon the first and second fans of diffracted beams traverse in the area of the curved roadway section,
    marking selected points at which said first and second fans of diffracted laser beams intersect, and
    connecting said selected points as to define the centerline of the curved roadway section.

5. A laser surveying method for defining the width of a curved path, said method comprising:
    separately positioning first and second laser beam sources along a path on opposing sides of a curved path portion,
    interposing first and second rulings having predetermined frequencies in front of the first and second laser beam sources as to effect first and second fans of diffracted laser beams, which fans traverse in the area of the curved path section,
    impinging the zero order of the first and second diffracted beams upon a marker therebetween which is representative of a reference elevation corresponding to one portion of the curved path,
    adjusting the angular orientation of said first and second rulings to define planes outlined by the fans of diffracted beams,
    marking the intersection of the diffracted laser beams at selected points so as to define the width of the curved path.

6. The method as recited in claim 5 wherein said marker is positioned along the centerline of the curved path whose width is to be defined.

7. A laser surveying method for defining the width of a straight path, said method comprising:
    separately positioning first and second laser beam sources along a path on opposite sides of a straight path portion;
    interposing first and second rulings having predetermined frequencies in front of the first and second laser beam sources as to effect first and second fans of diffracted laser beams, which fans traverse in the area of the straight path,
    impinging the zero order of the first and second laser sources upon a marker therebetween which is representative of a reference elevation corresponding to one portion of the straight path,
    marking the intersection of the diffracted laser beams at selected points as to define the width of the straight path.

8. The method as recited in claim 7 wherein said marker is positioned along the centerline of the straight path whose width is to be defined.

* * * * *